UNITED STATES PATENT OFFICE.

BERNHARD HEYMANN, OF ELBERFELD, GERMANY, ASSIGNOR TO THE FARBENFABRIKEN OF ELBERFELD COMPANY, OF NEW YORK.

ESTER OF ACETYLPHENYLGLYCINORTHO CARBONIC ACID.

SPECIFICATION forming part of Letters Patent No. 647,263, dated April 10, 1900.

Application filed January 16, 1900. Serial No. 1,655. (No specimens.)

*To all whom it may concern:*

Be it known that I, BERNHARD HEYMANN, doctor of philosophy, chemist, (assignor to the FARBENFABRIKEN OF ELBERFELD COMPANY, OF NEW YORK,) residing at Elberfeld, Germany, have invented a new and useful Improvement in the Manufacture of Dialkylesters of Acetylphenylglycinortho Carbonic Acid; and I hereby declare the following to be a clear and exact description of my said invention.

I have found that the neutral esters of acetylphenylglycinortho carbonic acid, having the general formula

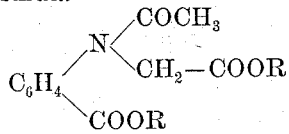

(R meaning an alkyl radical, such as ethyl, methyl, or the like,) represent very valuable starting materials for the production of indigo. These esters, which were unknown up to the present time, can be obtained by subjecting the neutral esters of phenylglycinortho carbonic acid to the action of acetylizing agents, such as acetyl chlorid or the like. The new bodies represent white crystalline substances soluble in ether, benzene, and alcohol. They are characterized by the fact that they yield an indigo leuco compound in a very profitable manner if they are mixed with dry caustic alkalies and heated on a water-bath.

In carrying out my new process practically I can proceed as follows, the parts being by weight: A mixture of twenty-five parts of the diethylester of phenylglycinortho carbonic acid and sixteen parts of acetylchlorid is heated for about one hour on a water-bath in a vessel provided with a reflux condenser. Subsequently the excess of acetyl chlorid is distilled off and the oily residue thus obtained, which soon transforms into a crystalline mass, is washed with cold water. On dissolving this mass in ether and adding ligroin to the resulting solution the diethylester of the acetylphenylglycinortho carbonic acid separates in the shape of cubic crystals, which are isolated by filtration and dried. The new ester thus obtained, having the formula

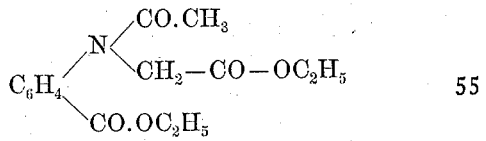

represents a white crystalline substance melting at 62° centigrade. It is soluble in ether, benzene, and alcohol. If a mixture of the new ether with dry powdered caustic potassa is heated on a water-bath, a yellow melt is produced under evolution of alcohol, which melt contains an indigo leuco compound. On diluting this melt with water and causing air to pass through the liquid this leuco compound is transformed into indigo.

The process proceeds in an analogous manner if instead of the neutral ethyl ester other alkyl esters of phenylglycinortho carbonic acid are employed in the above example. Thus, for instance, on using the dimethyl ester of phenylglycinortho carbonic acid the neutral dimethyl ester of acetylphenylglycinortho carbonic acid is obtained in the shape of a white crystalline substance melting at 83° centigrade.

Having now described my invention and in what manner the same is to be performed, what I claim as new, and desire to secure by Letters Patent, is—

1. As new articles of manufacture the new esters of the general formula

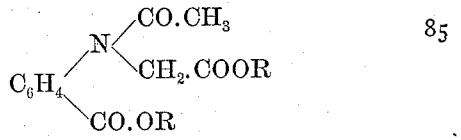

(R meaning an alkyl radical,) which are white crystalline substances, soluble in ether, benzene and alcohol, and which are characterized by the fact that they yield an indigo leuco compound if they are heated with dry caustic alkalies on a water-bath, substantially as hereinbefore described.

2. As a new article of manufacture the diethylester of acetylphenylglycinortho carbonic acid having the formula

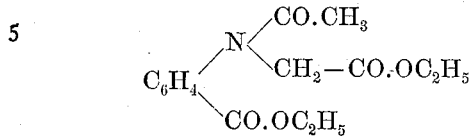

which is a white crystalline substance, soluble in ether, benzene and alcohol, melting at 62° centigrade and which is characterized by the fact that it yields an indigo leuco compound if it is heated with dry caustic alkalies on a water-bath, substantially as hereinbefore described.

In testimony whereof I have signed my name in the presence of two subscribing witnesses.

BERNHARD HEYMANN.

Witnesses:
OTTO KÖNIG,
F. A. RITTERSHAUS.